United States Patent
Giessl

(10) Patent No.: US 9,937,460 B2
(45) Date of Patent: Apr. 10, 2018

(54) ACTIVE CARBON FILTER SYSTEM

(71) Applicant: A. KAYSER AUTOMOTIVE SYSTEMS GMBH, Einbeck (DE)

(72) Inventor: Andreas Günter Giessl, Limeshain (DE)

(73) Assignee: A. KAYSER AUTOMOTIVE SYSTEMS GMBH, Einbeck (DE)

( * ) Notice: Subject to any disclaimer, the term of this patent is extended or adjusted under 35 U.S.C. 154(b) by 87 days.

(21) Appl. No.: 15/187,015

(22) Filed: Jun. 20, 2016

(65) Prior Publication Data

US 2016/0367933 A1 Dec. 22, 2016

(30) Foreign Application Priority Data

Jun. 22, 2015 (DE) .................. 10 2015 008 011

(51) Int. Cl.
*B01D 53/04* (2006.01)
*F02M 25/08* (2006.01)

(52) U.S. Cl.
CPC ....... *B01D 53/0407* (2013.01); *F02M 25/089* (2013.01); *F02M 25/0854* (2013.01); *B01D 2253/102* (2013.01); *B01D 2259/4516* (2013.01); *B01D 2259/4566* (2013.01)

(58) Field of Classification Search
CPC .......... B01D 53/0407; B01D 2253/102; B01D 2259/4516; B01D 2259/4566; F02M 25/0854; F02M 25/089
USPC ............. 95/146; 96/134, 147; 123/518, 519, 123/198 E
See application file for complete search history.

(56) References Cited

U.S. PATENT DOCUMENTS

| | | | | |
|---|---|---|---|---|
| 3,678,663 A | * | 7/1972 | Hansen | F02M 25/08 55/DIG. 28 |
| 6,440,200 B1 | * | 8/2002 | Sakakibara | B01D 46/0023 123/519 |
| 6,835,237 B2 | * | 12/2004 | Ishida | B01D 46/0023 123/518 |
| 7,163,574 B2 | * | 1/2007 | Bause | B01D 53/02 55/385.3 |
| 7,278,406 B2 | * | 10/2007 | Hagler | B01D 53/0415 123/516 |
| 2006/0150811 A1 | * | 7/2006 | Callahan | B01D 53/0415 95/146 |
| 2007/0186904 A1 | | 8/2007 | Braithwaite et al. | |
| 2009/0186904 A1 | * | 7/2009 | Lubisch | C07D 401/12 514/253.09 |
| 2010/0089368 A1 | * | 4/2010 | Hirata | B01D 53/0431 123/518 |

FOREIGN PATENT DOCUMENTS

DE 102007006424 A1 8/2007

* cited by examiner

*Primary Examiner* — Frank Lawrence
(74) *Attorney, Agent, or Firm* — Richard M. Goldberg

(57) ABSTRACT

A filter system, in particular as part of a fuel vapor buffer installation for reducing hydrocarbon emissions includes at least one filter 15, in particular a filter having channels and active carbon, and a housing 2 for receiving the filter 15, wherein the housing 2 has separate or integral holding devices for fixing the filter 15 and wherein at least one gap or gap space 28 is provided between the inner wall 6 of the housing 2 and the outer circumference of the filter 15 that has a fluid connection to the region causing the emissions and to the atmosphere.

19 Claims, 6 Drawing Sheets

Section 10-10

Section 10-10

Detail A

Detail B

Detail C

ACTIVE CARBON FILTER SYSTEM

BACKGROUND OF THE INVENTION

The invention concerns a filter system, in particular as part of a fuel vapor buffer installation for reducing hydrocarbon emission.

The active carbon filter systems or fuel vapor buffer installations, referred to as active carbon filters among experts, that are incorporated in vehicles and designed to prevent that vapors from the fuel tank are released into the environment, contain active carbon granules and regularly have to be rinsed or regenerated with fresh air. The corresponding rinsing cycles and rinsing volumes, however, are gradually decreasing so that, as a consequence, hydrocarbons that cannot be completely removed as a result of the feasible rinsing processes remain bonded in the active carbon filter. For testing the emissions escaping from a vehicle and thus from the active carbon filter, first of all the vehicle is subjected to a certain driving cycle. During such driving cycle the rinsing processes take place, which, however, are restricted to certain operational conditions of the vehicle and, consequently, do not suffice any more for sufficiently rinsing the active carbon filter. As a consequence, the hydrocarbons may remain bonded in the active carbon filter. After conclusion of the driving cycle, the vehicles are immediately taken into a so-called SHED chamber and subjected to a test lasting up to three days. Within the scope of the test, the vehicle is not moved, however it is subjected to broad-scale temperature variations. Accordingly, during the SHED test, hydrocarbon emissions escape from the vehicle in its entirety which also concerns fuel vapors from the tank system including the active carbon filter. It has turned out that the problem during the SHED test is not only the evaporation from the tank but also the evaporation of detrimental hydrocarbons remaining in the active carbon filter. In respect to vehicles launched on the US market threshold values for admissible hydrocarbon emission are particularly low so that on this market, in addition to the active carbon granules, a separate or additional filter system has to be incorporated into the fuel vapor buffer installation.

What is disadvantageous about current additional filter systems of the active carbon filter or the fuel vapor buffer installation is the rinsing process. The active carbon filter and thus also the additional filter system as part of the active carbon filter are arranged in the ventilation line of the tank. In the case of tank refueling or a temperature-induced extension of the contents of the tank, the air present in the tank has to be dissipated through the active carbon filter. Consequently, the active carbon filter is designed to prevent that fuel vapors are released into the atmosphere. However, in the case of active carbon filters it is required that intermittently a so-called rinsing process is continuously carried out. Thus, atmospheric air is reversely guided through the active carbon filter in order to regenerate the fuel vapor buffer installation, i.e. to rinse out the hydrocarbon vapors bonded in the active carbon granules and in the additional filter system. Herein, also fuel vapors that are not bonded in the active carbon granules or in the filter of the additional filter system but in peripheral components, such as foams or seals used for fixation or sealing, are rinsed. After passing the fuel vapor buffer installation and having been enriched with fuel vapors, the rinsing air is fed to the combustion process in the motor.

In the active carbon filters according to prior art having additional filter systems, sealing elements are provided, wherein it has been found that the rinsing processes meanwhile do not suffice any more to completely clean the active carbon filter due to the fact that an efficient cleaning of the peripheral components, such as the foam circle, the foam strip or the sealing elements, may only be effected completely provided that the rinsing period is very long, which, however, is not possible in practical operation.

SUMMARY OF THE INVENTION

It is an object of the present invention to propose an additional filter system as part of an active carbon filter system that can be realized in a simple and cost-efficient manner and whose emissions can be kept at a lower level in comparison to conventional active carbon filter systems.

In accordance with the invention, the above-mentioned object is solved by the features of the claims. Advantageous embodiments of the filter system according to the invention are outlined in the subclaims.

Among others, it is the object of the present invention to take up the filter of the additional filter system in its housing in such a way that hydrocarbon vapors, bonded in the filter and/or dissolved in the air present in the filter receiving region, can be completely dissipated by rinsing in order to promote the reception (adsorption) of hydrocarbons, after rinsing the filter system, of the air escaping from the tank system at the filter.

So far it has been assumed that vapors from the tank must definitely not escape to the outside in an unfiltered way, but virtually have to be forced to finally also flow through the filter of the additional filter system. Consequently, seals or foams have been used in the housing for receiving the filter in order to prevent by all means that hydrocarbon vapors are emitted to the environment or the atmosphere in an unfiltered manner. However, using seals or foams in turn results in the presence of detrimental vapors in the regions beyond the filter that cannot be completely removed by a rinsing process.

While seals or foams may still be used in the active carbon filter, the proposed filter system rules out the former basic principle and in particular does without the use of any sealing elements in the filter system. Instead, a predetermined gap or gap space between the inner wall of the housing, in which the filter is arranged, and the outer wall or the outer circumference of the filter is provided through which partly unfiltered vapors or emissions may be released into the environment.

Due to the specific dimensioning of the cross-sectional surface of this gap, the partly unfiltered hydrocarbon vapors released to the outside are still in the admissible range as regards their quantity. It has been found that surprisingly the hydrocarbon vapors present in the gap space can be removed by rinsing in a better way than before. It has been recognized that detrimental emissions settle in the seals or foams that cannot be removed completely by a rinsing process but only slowly in the course of time escape from the seals and the air present in the gap and thus also into the environment, which, however, is an undesired effect. In the result, the proposed filter system provides considerably more favorable emission values. By dispensing with seals and foams costs and mounting periods can be reduced considerably.

So far, the prevailing opinion was that it was unacceptable that hydrocarbon vapors flow past through a gap between housing and filter in an unfiltered manner and thus do not flow through the filter. However, it has been found that this opinion is not correct. Tests have shown that the proposed filter system releases substantially less hydrocarbons to the environment than the systems conventionally known. Herein however, the gap should not lead to a bypass, which would enable too large an amount of hydrocarbon emissions to flow past the filter to thus escape into the environment.

Therefore, according to the invention, a gap or gap space is provided between the inner wall of the housing and the outer wall of the filter that permits a direct fluid connection between the environment or atmosphere and the region causing the hydrocarbon emissions, for example the tank of a vehicle, that enables a part of the hydrocarbon emissions not to flow through the filter.

Herein, it is understood that the hydrocarbons escaping from the tank first of all are always guided through the active carbon granules prior to flowing through the additional filter system. Further, the filters used in the additional filter system are referred to as honeycomb bodies or as active carbon honeycomb bodies or honeycombs among experts. As a rule, the honeycomb bodies consist of ceramic reinforced active carbon. For reasons of manufacture, the basic structure usually comprises a great number of channels arranged in parallel and having identical diameters in the longitudinal axis direction or the flow-through direction of the filter enabling a defined flow guidance with little pressure lost. However, also different channel structures, i.e. a non-parallel extension and/or unequal channel diameters can be devised. As a rule, the channels' cross sections have a quadrangular shape but may optionally also have a round or hexagonal shape. The filter body as a rule has a cylindrical shape, even though it may optionally also be block-shaped, and has a closed outer circumferential surface. Accordingly, the housing corresponds with the shape of the filter and vice versa. The invention will be described by way of example of a cylindrically shaped embodiment of the filter and the housing, wherein the invention is not to be regarded to be limited to this embodiment; in particular the housing and the filter may also be embodied to be block-shaped. The design, characteristics and/or the material of the filter are not of any importance either with regard to the basic idea of the present invention. It is pointed out again that upstream of the filter of the additional filter system claimed herein, there is always a container arranged containing active carbon granules through which the hydrocarbon vapors flow first, which however does not form part of the present invention. In the following, the filter of the claimed filter system occasionally is also referred to as honeycomb body.

A decisive principle idea of the proposed additional filter system is that in the arrangement of the filter or honeycomb body in its housing, no seals or foams are made use of, i.e. a seal-free assembly of the filter in the housing is effected. The arrangement of the filter preferably is effected by means of clamping or holding devices that, for example, are separate parts or parts of the housing itself or to be additionally attached thereto, wherein it has to be made sure that these parts are no seals. Consequently, there will be no evaporation of hydrocarbon emissions from seals, which has a positive effect with regard to the overall emission of hydrocarbons as the hydrocarbon emissions collectively escaping from the system are reduced. Preferably, the housing is integrally formed and thus has no components that have to be manufactured separately and mounted as supplementary parts.

Advantageously, the cross-sectional surface of the gap between the inner wall of the housing and the outer wall of the filter body is defined such with respect to the filter body cross-sectional surface that, in particular during the rinsing process, the flow velocity through the gap amounts to 10% to 200%, preferably to 10% to 60%, further preferably to 30% to 150%, still further preferably to 80% to 150% and also preferably to between 100% to 200% of the flow velocity through the filter. Herein, the flow velocity is to be considered in the longitudinal or flow-through direction of the filter.

Herein, it is sufficient to adjust the flow velocity through the gap (as seen in the longitudinal direction of the filter) according to the flow velocity through the filter, i.e. it is not required that the two flow velocities are exactly identical in order to achieve the desired success. It is sufficient that approximately the same flow velocities are achieved. This adjustment of the flow velocities additionally is advantageous with regard to the emissions escaping from the system as a whole.

Advantageously, the ratio of the cross-sectional surface of the gap between the inner wall of the housing and the outer wall of the filter with regard to the filter body cross-sectional surface amounts to 1.0 to 0.001, preferably to 0.5 to 0.003, namely in the range of at least 50% to 75% as seen over the longitudinal extension of the housing or the filter body, but at least at one position.

This in turn is advantageous in so far as the fuel emissions escaping from the system on the whole may be reduced still further. Regularly, the manufacture of the housing is effected by injection molding, which leads to the effect that for example a cylindrical design of the inner wall of the housing may not be realized to be exactly cylindrical due to the way of manufacture, but is in fact slightly conical or frusto-conical. In other words, the hollow space of the housing receiving the filter widens or narrows as seen in its longitudinal axis direction from the bottom to the top end of the housing. The filter to be inserted, whose shape should be adjusted such that it is in accordance with the hollow space of the housing and consequently should also be cylindrical, has to do without such conicity which is attributable to production conditions, and in the present case thus has to be manufactured to be cylindrically shaped. If now the filter or honeycomb body is inserted into the hollow space of the housing, there will be a narrower spacing in the free end region of the housing between the housing's inner wall and the outer wall of the honeycomb body, whereas there will be a wider spacing at the other free end region, as seen perpendicularly to the longitudinal axis of the housing. Additionally, manufacturing tolerances in the housing (+/−1 mm) and in the honeycomb body (+/−0.7 mm) have to be taken into account. The prevailing diameters of cylindrical honeycomb bodies amount to 29 mm to 41 mm and in the case of honeycomb bodies with a rectangular shape cross section, the prevailing length/width of the cross section is 25 mm to 35 mm. The gap between the inner wall of the housing and the outer wall of the honeycomb body, as seen perpendicularly to the longitudinal axis of the housing, preferably amounts to 0.05 mm to 1.3 mm. In this gap width range, the desired success of reducing emissions is always achieved.

At least due to the conicity of the hollow space or the filter reception space of the housing, the gap width and thus also the gap cross-sectional surface changes in the course of the longitudinal axis of the housing or the honeycomb body. It is therefore understood that the above-mentioned ratio cannot be kept constant along the entire longitudinal axis of the housing or the honeycomb body so that necessarily, a range has to be indicated that leads to the desired effect. Preferred gap widths between the inner wall of the housing and the outer wall of the honeycomb body, as seen perpendicularly to the longitudinal axis of the housing or the honeycomb body, respectively, are 0.05 to 5.0 mm.

Preferably, a first holding device for fixation of the filter in the lower region of the inner wall of the housing is provided in the form of a circular, annular shoulder that tapers the open overall cross section in this region of the housing.

The shoulder may serve as an annular abutment surface for the filter to be inserted into the housing, wherein the shoulder has devices permitting a flow between the shoulder and the bottom side or the bottom of the filter.

Advantageously, the annular shoulder has a support for the filter in the form of at least three elevations extending upwardly from the annular shoulder, as seen in a longitudinal direction of the housing.

Thus, as a result, an advantageous statically determined three-point support for the honeycomb body in the housing is achieved. The description of the direction "upwardly" in the sense of this advantageous embodiment means extending from the shoulder, located in an end region of the housing, towards the other end of the housing, consequently in a longitudinal axis direction of the housing.

Functionally, the surface of the annular shoulder and the support surfaces of the elevations are formed so as to extend obliquely downwards towards the center of the housing, as seen in a longitudinal direction of the housing.

Owing to this advantageous embodiment, first of all an advantageous central alignment and thus the centering of the filter or the honeycomb body in the housing or the hollow space of the housing is achieved. In the region of the annular shoulder, this embodiment of the invention thus comprises a circular shoulder in the circumferential surface of the honeycomb body receiving geometry that tapers the overall cross section of the honeycomb body receiving geometry. This shoulder can be embodied such as to have an inclination or conicity. By varying the inclination angle and the clearance between the surface of the shoulder and the support surfaces of the elevations, the flow through the gap between the honeycomb body and the honeycomb body receiving geometry can be influenced in an advantageous manner. If, by way of example, the inclination of the shoulder is parallel in respect to the support surfaces of the elevations, the clearance between the shoulder and the honeycomb body, as measured from the outer edge of the honeycomb body perpendicularly to the support surface of the elevations (the clearance may also be referred to as gap dimension perpendicular to the surface of the elevations), is always constant, even if the cross-sectional surface of the honeycomb body changes due to manufacturing tolerances.

If the inclination of the surface of the shoulder is selected such that it has a flatter angle than the angle of the support surfaces of the elevations, in the case of larger honeycomb body diameters, a smaller clearance between the outer edge of the honeycomb body and the surface of the shoulder is achieved and vice versa, which enables influencing the volume flow flowing past the honeycomb body on the outside, namely depending on the diameter of the honeycomb body.

Advantageously, the inclination of the surface of the annular shoulder and the inclination of the support surfaces of the elevations, as seen with regard to the longitudinal axis of the housing, may amount to 45°, which generates an optimized volume flow.

The shoulder has an annular shape in the case that a cylindrically shaped filter is to be arranged in the housing. If a block-shaped filter is used, use is made of a housing having a rectangular or quadratic cross section and consequently, the annular shoulder will be accordingly rectangular or quadratic. The housing and thus also the shoulder will follow the geometry of the filter and vice versa, wherein, however, certain differences in the geometries are possible. The housing may for example be cylindrically shaped, whereas the filter may be polygonally shaped and vice versa. However, the above-mentioned advantages resulting from the shoulder are preserved, irrespective of the geometry of the filter or the housing.

Advantageously, a second holding device for fixing and centering the filter in the upper region of the housing in the upper region of the housing is provided in the form of at least three catcher hooks or snap-fit hooks preferably integrally formed with the housing.

Herein, at one end of the housing, the catcher hooks or snap-fit hooks, preferably formed as resilient elements, may have support surfaces oriented conically towards the longitudinal axis of the housing.

Both the resilient elements and the inclination of their support surfaces aim at axially centering the honeycomb body within the housing, such that a constant clearance between the honeycomb body and the housing and thus a constant rinsing or flow at the outer surface of the honeycomb body is facilitated. The resilient elements, in particular when embodied as snap-fit hooks, ensure the fixation of the honeycomb body within the housing. Preferably, the catcher or snap-fit hooks also serve to fix and center the honeycomb body within the housing.

Advantageously, the snap-fit hooks are arranged in a circular manner and on different levels at the inner wall of the housing as seen with regard to the longitudinal axis of the housing.

Preferably, the support surfaces and the resilient elements or snap-fit hooks are dimensioned such and preferably arranged in multiple versions and in a staggered manner such that dimensional tolerances or, for example, different thermal expansion coefficients between the housing and the honeycomb body can be offset to thus ensure fixation and centering also over a given tolerance range.

Advantageously, at least three longitudinal ribs may be formed at the inner wall of the housing for fixing and centering the filter. On the one hand, the longitudinal ribs aim at centrally arranging the honeycomb body in the housing, whereas on the other hand, they serve to space the honeycomb body apart from the inner wall of the housing at all positions or regions in order to produce the desired gap between the inner wall of the housing and the outer wall of the honeycomb body. Herein, the longitudinal ribs may extend at the inner wall of the housing along the entire length as seen in the longitudinal axis direction. Optionally, however, the longitudinal ribs may also be formed to extend at the inner wall of the housing only in a section-wise or partial manner along the length as seen in the longitudinal axis direction.

Preferably, axially securing the honeycomb body may also be effected by an elastic element, such as for example a compression spring. Herein, the compression spring may preferably be arranged above the honeycomb body at the housing, in particular at a cover-like termination of the housing, such that clamping is effected between the upper termination of the filter and the housing. Due to its bias, the compression spring pushes the honeycomb body in the longitudinal direction of the housing or the honeycomb body towards the shoulder or the elevations and in this way supports the fixation and centering of the honeycomb body within the housing.

Finally it is also advantageous to arrange a fuel-vapor-permeable mesh or a fuel-vapor-permeable matted fiber structure made of a resilient material, which preferably does not absorb any or at least only little fuel vapors and has a relatively low flow resistance, such as a metal gauze or coarse glass fiber wool, in the gap between the housing and the filter for fixation of the filter in the housing.

The preferred materials are air-permeable and only imperceptibly obstruct the desired flow between the housing and the honeycomb body; however, they may substitute holding devices for fixing and centering the honeycomb body in the housing.

BRIEF DESCRIPTION OF THE DRAWINGS

In the following, the subject-matter is described in more detail with reference to a preferred embodiment. The drawings show.

DETAILED DESCRIPTION

Figure 1:
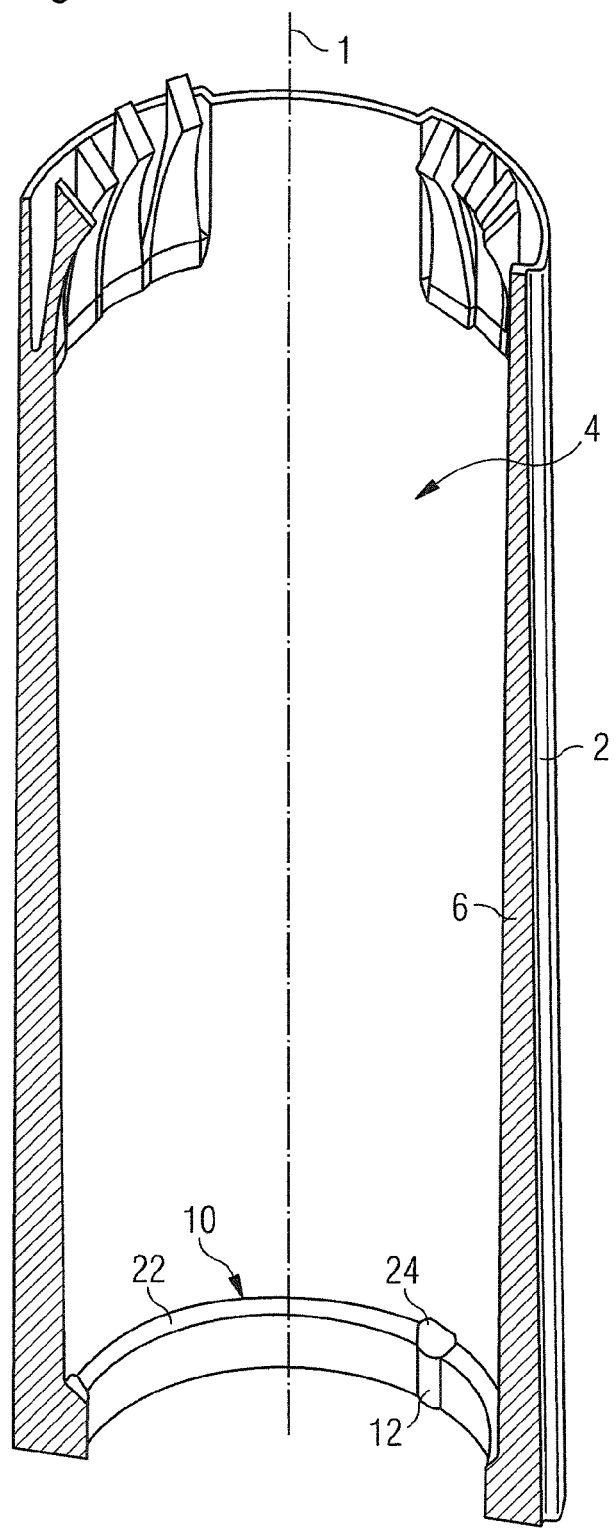
FIG. 1: A longitudinal section through a housing for receiving a filter in a perspective view

FIG. 1 shows in a longitudinal section in parallel to longitudinal axis 1, the housing 2 of a filter system for reducing hydrocarbon emissions in a perspective view not including the filter to be inserted into the housing 2. Upstream of the housing 2, a container not shown and containing active carbon granules is arranged, wherein the housing 2 may be designed to be separate from the active carbon granules container or as a part of the latter. In the embodiment shown here, the housing 2 has a cylindrically shaped configuration into the hollow space 4 of which the equally cylindrically shaped filter or honeycomb body is to be inserted.

The wall 6 of the housing 2 tapers in an upward direction such that the hollow space 4 of the housing 2 reduces in an upward direction as seen along the longitudinal axis 1. As has been explained above, the conical course of the hollow space 4 is attributable to production conditions since due to injection molding process production the hollow space cannot be designed to be exactly cylindrically shaped but has to be slightly conical or frusto-conical.

In the upper free end region of the housing 2, a plurality of snap-fit hooks 8 is arranged at the inner circumference of the housing 2 that preferably are produced together with the housing 2 by injection molding. Herein, the snap-fit hooks 8 may preferably be arranged to surround the entire circumference of the upper region of the housing 2 and thus the upper termination of the hollow space 4 in a distributed manner. Herein—as will be explained in more detail further below—with regard to the longitudinal axis 1, the snap-fit hooks 8 are arranged on different levels or heights, i.e. as seen with regard to longitudinal axis 1 of the housing 2, they are arranged one above the other or one below the other. In the lower region of the housing 2 or in the lower free end region of the hollow space 4, respectively, an annular shoulder 10 is arranged at the inner circumference of the housing 2. Preferably the annular shoulder 10 has three elevations 12, which, as seen in the longitudinal axis direction of the housing 2, extend beyond the upper termination or the surface 22 of the annular shoulder 10. The surfaces of the elevations 12 may serve as abutment surfaces 24 for the filter not shown here. Consequently, as seen in a longitudinal axis direction of the housing 2, the abutment surfaces 24 of the elevations 12 are located above the surface 22 of the annular shoulder 10.

Figure 2:
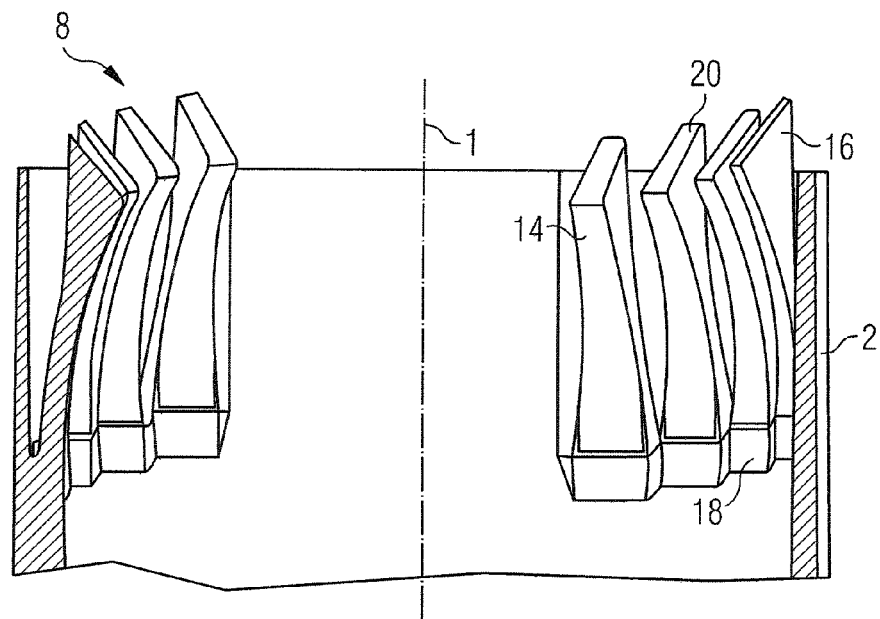
FIG. 2: A detailed view of the upper region of the housing according to FIG. 1 not including an inserted filter

FIG. 2 shows the upper region of the housing 2 in an enlarged detailed view, wherein again—as also applies to FIG. 1—there is no filter arranged in the housing 2 or in the hollow space 4. FIG. 2 shows a total of eight catcher or snap-fit hooks, wherein, as seen in the circumferential direction around the housing 2, within the groups of four, the snap-fit hooks are preferably arranged to be close to one another. However, the clearance between the snap-fit hooks may also be identical. A larger clearance is provided between the groups of four closely arranged snap-fit hooks 8. It is understood that according to this preferred embodiment, a total of twelve snap-fit hooks 8 is arranged along the entire inner circumference of the housing 2, namely divided into three groups each of which contains four snap-fit hooks 8. Each of the snap-fit hooks 8 has a contact surface 14 facing the center of the housing 2 and thus pointing towards the filter to be arranged (cf. FIG. 3).

Figure 3:
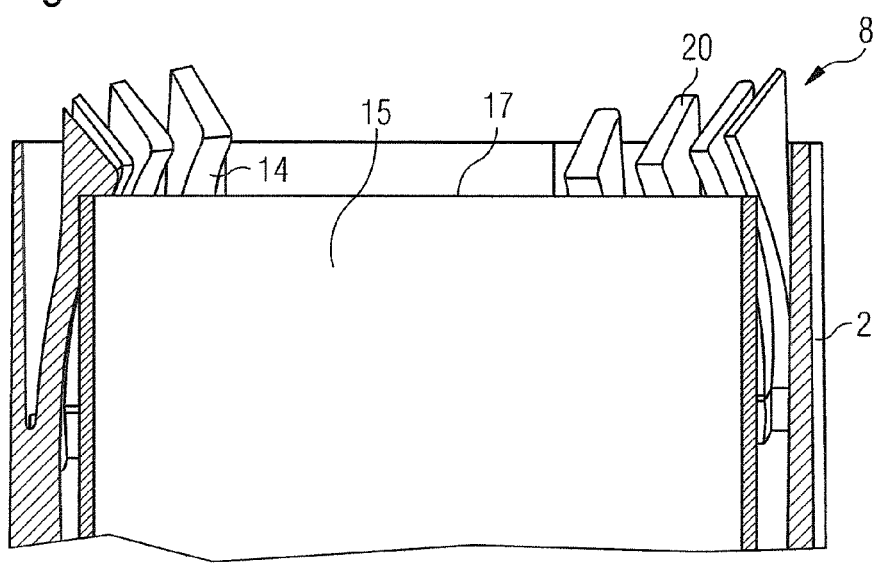
FIG. 3: The detailed view according to FIG. 2 including an inserted filter

FIG. 3 shows the illustration according to FIG. 2; however with the honeycomb-structured filter 15 contained in the housing 2. It is understood that, due to the substantially cylindrically shaped configuration of the hollow space 4 of the housing 2, the configuration of the filter 15 is also cylindrical.

As described in more detailed in the following with regard to FIG. 5, the bottom side 11 of the filter 15 not shown in FIG. 3 and forming a circular surface rests on the elevations 12. In order to fix the filter 15 with regard to its arrangement in the housing 2 and to also center it, the snap-fit hooks 8 of each of the groups of four snap-fit hooks 8 are not only provided with the contact surfaces 14 but are also arranged on different levels. The contact surfaces 14 of the snap-fit hooks 8 facing the filter 15 extend in an arc-shaped manner, i.e. they extend so as to conically taper towards the bottom, such that the upper free end region 16 of the snap-fit hooks 8 is formed stronger or thicker than their lower region 18, namely as seen in the direction of the longitudinal axis 1, respectively. The lower region 18 merges into the housing, whereas the end region 16 is not connected with the housing 2. Thus, the snap-fit hooks 8 are formed as projections extending upwardly in the direction of the longitudinal axis of the housing 2. Due to the conical shape of the snap-fit hooks 8 with their stronger or thicker upper end regions 16 in the direction of the longitudinal axis 1, the free ends or the upper region 16 of the snap-fit hooks 8 are tilted towards the center or the longitudinal axis 1 of the housing 2.

When the filter 15 illustrated in FIG. 3 is inserted into the housing 2, this is carried out, as seen in FIG. 3, in a direction from the top to the bottom. In order to enable the filter 15 to overcome the projecting snap-fit hooks 8, these have to be moved away outwardly, as seen radially with regard to the longitudinal axis 1, when the filter 15 is inserted. Herein, it is understood that the cross section released by the snap-fit hooks 8 has to be smaller than the cross section or the lower circular termination of the filter 15 to be inserted. For simple insertion of the filter 15, in their upper free end regions 16 the snap-fit hooks 8 have surfaces 20 extending in an oblique or wedge-shaped manner towards the bottom and permitting an easy insertion of the filter 15.

Owing to the arrangement of the snap-fit hooks 8 described above, varying lengths of the filter 15 (varying lengths of the filter 15 as seen in the longitudinal axis direction of the housing 2 are due to manufacturing tolerances) may be taken into account. Irrespective of the level position of the upper termination 17 of the filter 15, at least one snap-fit hook 8 of each of the groups of snap-fit hooks 8 is able to contact the upper edge of the filter 15 in a clamping manner so as to not only fix the filter 15 within the housing 2 but to also center it there. In the case that centering the filter 15 by the snap-fit hooks 8 is to the fore, it is advantageous that three groups, each of which contains four snap-fit hooks 8, are arranged at the inner circumference of the housing 2 in the upper region thereof.

Figure 4:
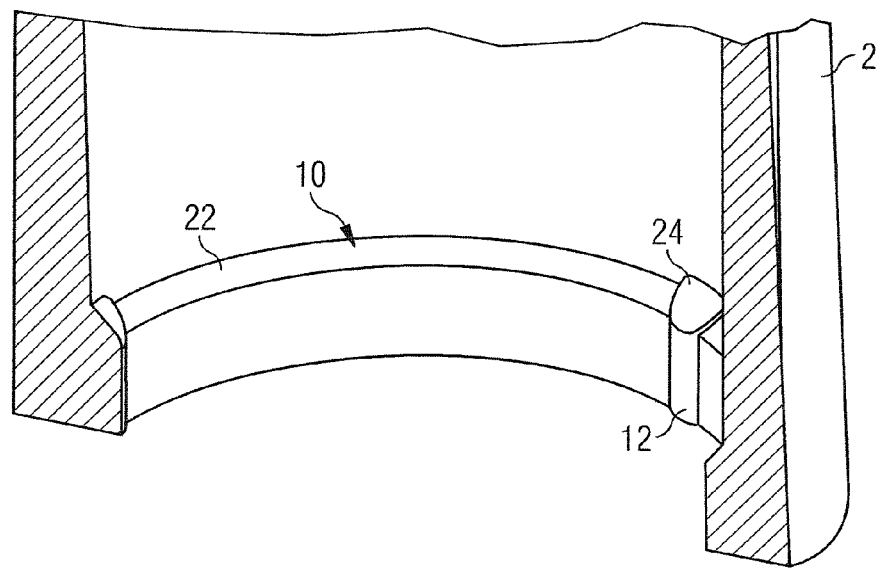
FIG. 4: A detailed view of the lower region of the housing according to FIG. 1 not including an inserted filter

FIG. 4 shows a detailed view of the lower region of the housing 2 according to FIG. 1 which illustrates the annular shoulder 10 and the elevations 12 projecting from the annular shoulder 10. As is also applicable to the surfaces or support surfaces 24 of the elevations 12, the surface 22 of the annular shoulder 10 is formed to be inclined. To be more precise, the inclination extends towards the lower free end region of the housing 2, preferably at an angle of 45°.

Figure 5:
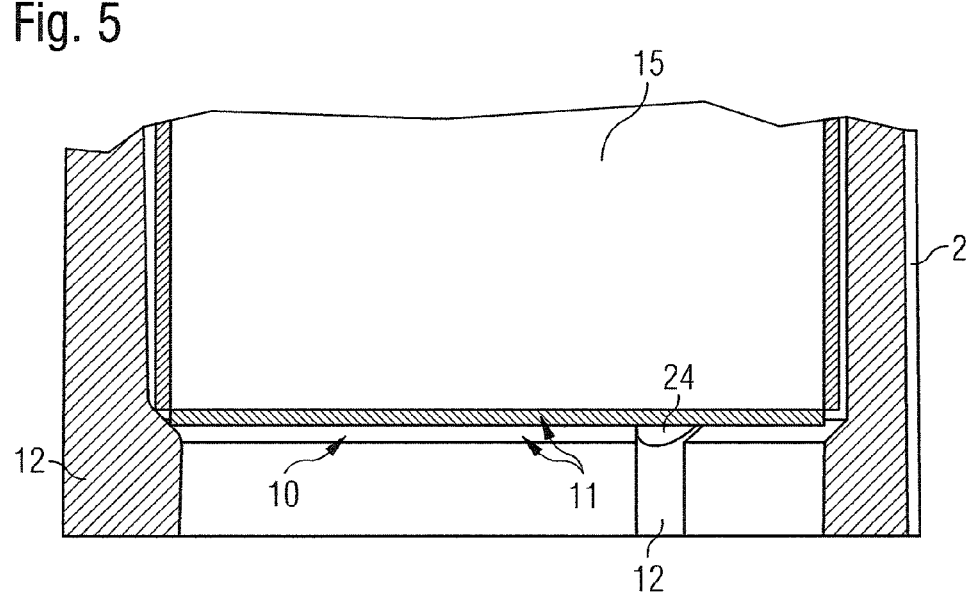
FIG. 5: A longitudinal section through the lower region of the housing according to FIG. 1 including an inserted filter

In contrast to FIG. 4, FIG. 5 now illustrates the lower region of the housing 2 with filters 15 of different dimensions inserted as well as the annular shoulder 10 and the elevations 12. Herein, the cross section of FIG. 5 has been effected in such a way that in the left-hand lower region of the filter 15 the section (as is also shown in FIG. 4) extends through elevation 12 such that the lower corner regions of the outer edges of the filters 15, shown to be differently sized here, are directly located on the support surfaces 24 of the elevations 12 so as to touch them. In contrast thereto, the section in the right-hand lower region of the housing 2 of FIG. 5 has not been effected to extend through the elevation 12, but through the annular shoulder 10. Consequently, in the right-hand lower region a clearance of the lower edge of the filter 15 shown here as seen perpendicularly to the surface 22 of the annular shoulder 10 is yielded. In the following, the clearance already mentioned above is discussed in more detail with regard to FIG. 9.

Figure 6:
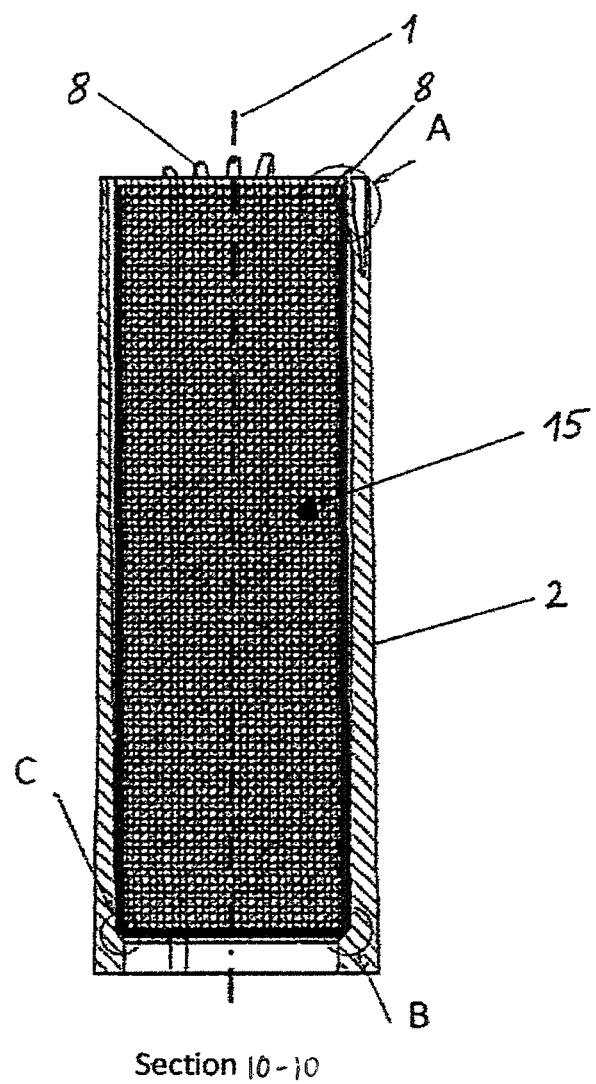
FIG. 6: A longitudinal section through the housing including an inserted filter according to section 10-10 of FIG. 10
Figure 10:
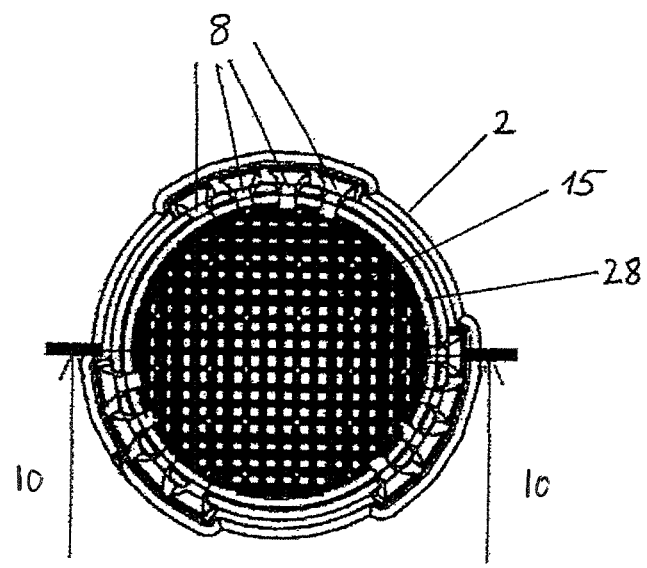
FIG. 10: A top view onto the housing according to FIG. 6

As also applies to FIG. 1, FIG. 6 again shows a longitudinal section 10-10 in parallel to the longitudinal axis 1 of the housing 2, however with the filter 15 being inserted. FIG. 10 shows the extension of section A-A according to FIG. 6. Reference signs that have been used in the preceding figures are identical. FIG. 6 corresponds with FIG. 1 so that a more detailed description of FIG. 6 can be omitted so far.

FIG. 6 includes details A, B and C that are explained in more detail with regard to the subsequent figures. The additional filter systems shown according to FIGS. 1 and 6 have in common that in order to arrange the filter 15 in the housing 2 merely the annular shoulder 10 with its elevations 12 and the snap-fit hooks 8 are provided. The conventionally common seals between the filter 15 and the inner circumference of the housing 2 are no longer present as, among others, it is the object of the invention to completely dispense with seals within or at the housing 2, in particular between the filter 15 and the housing 2.

Figure 7:
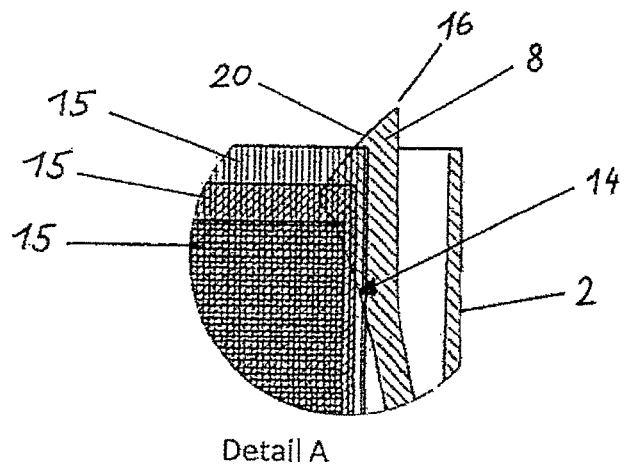
FIG. 7: Detail A according to FIG. 6 in an enlarged view

FIG. 7 shows detail A according to FIG. 6, i.e. the right-hand upper termination of the housing 2 according to FIG. 6 with only one single snap-fit hook 8 being illustrated. According to FIG. 7, three differently dimensioned filters 15 are illustrated. The different dimensions and thus the different level positions of the filters 15 are due to manufacturing tolerances in the manufacture of the filter 15, they may, however, also be due to manufacturing tolerances in the manufacture of the housing 2. As has been explained above, the upper free end region 16 of the snap-fit hook 8 has a wedge-shaped surface 20 pointing obliquely downwards towards the longitudinal axis of the housing 2, on which the bottom side 11 of the filter 15 may slide upon insertion into the housing 2 so that, when the filter 15 is inserted, the snap-fit hooks 8 are displaced or bent away outwardly towards the inner wall of the housing 2. As soon as the filter 15 has been completely inserted into the housing 2, i.e. as soon as its bottom side 11 rests on the elevations 12, the snap-fit hooks 8 can bend back again inwardly to the center or to the longitudinal axis 1 of the housing 2 since the upper edge or the upper termination of the filter 15 now is in contact with the contact surfaces 14 below the wedge-shaped surfaces 20. Accordingly, the snap-fit hooks 8 act as resilient elements and contact the upper end of the filter 15 in a clamping manner. In order to take account of the dimensional tolerances of the filter 15 to be inserted, the snap-fit hooks 8 are located at different level positions with respect to the longitudinal axis 1 of the housing 2 in order to ensure that at least one snap-fit hook 8 of each of the groups of snap-fit hooks 8 contacts the upper corner region of the filter 15 with its contact surface in a clamping manner.

Figure 8:
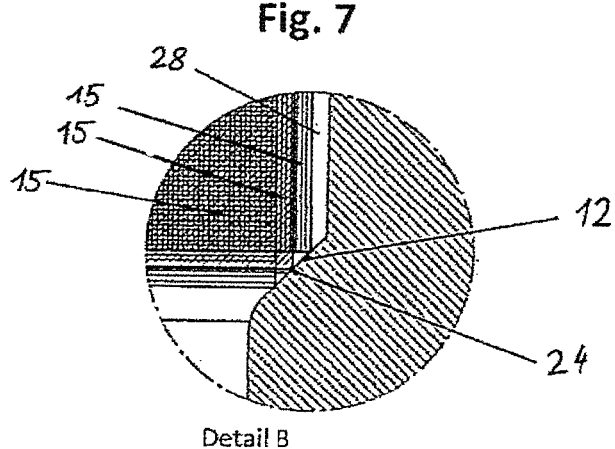
FIG. 8: Detail B of FIG. 6 in an enlarged view

FIG. 8 shows detail B according to FIG. 6, namely the lower right-hand marginal region of FIG. 6 in an enlarged view. Again, the arrangement of three differently sized filters 15 is shown in an exemplary way. Detail B shown in FIG. 8 represents a section through elevation 12 on which the lower edge region of any of the filters 15 rests. Accordingly, at this position the corner region of the inserted filter 15 contacts the support surface 24 of the elevation 12. If the lower cross-sectional surface of the filter 15 is larger, its edge region will slide upwardly on the support surface 24 in the longitudinal direction of the longitudinal axis 1 of the housing 2.

As has been mentioned above, it is preferable to provide three elevations 12 on the annular shoulder 10. As seen in a circumferential direction around the annular shoulder 10, three elevations 12 are arranged to be spaced apart from each other in such a way that between the elevations 12 there is a clearance between the lower edge region of the filter 15 and the surface of the annular shoulder 10 that forms three flow-in cross sections limited by the elevations. Consequently, a part of the emissions from the tank, not shown, that enter the housing from the bottom, may flow past the outer circumference of the honeycomb body. In order to allow for such flow, the diameter of the filter 15 always is smaller than the diameter of the hollow space 4 of the housing 2. Insofar, a gap 28 having an annular circular cross section is formed between the outer circumference of the filter 15 and the inner wall of the housing 2.

Figure 9:
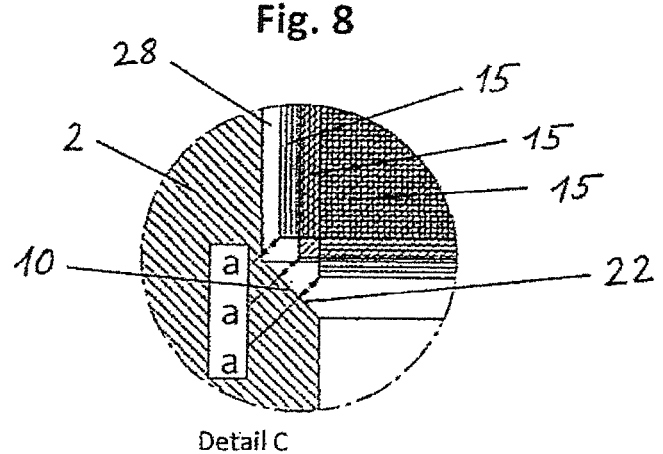
FIG. 9: Detail C according to FIG. 6 in an enlarged view

FIG. 9 finally shows detail C of FIG. 6 and thus the left-hand lower region according to FIG. 6, namely in a longitudinal section extending through the annular shoulder 10—in contrast to the section extending through an elevation 12—as shown in detail B of FIG. 8. Again, three filters 15 with different diameters are shown. As the longitudinal section according to FIG. 9 does not extend through the elevation 12 but through the annular shoulder 10 this yields a clearance, i.e. a non-abutment of the lower corner region of the filter 15 against the surface 22 of the annular shoulder 10. As has been mentioned above, the filters 15 illustrated in the embodiment shown have a cylindrically shaped configuration thus comprising in the lower region, a circular surface with an associated cylinder barrel extending in an upward direction. Consequently, in the longitudinal section through the lower region of the filter 15, the transition of the filter cylinder barrel into the circularly shaped abutment or base surface represents a square angle.

The clearance a between the lower corner of the filter 15 perpendicular to or onto the surface 22 of the annular shoulder 10 is always the same, irrespective of the diameters of the filters 15. As mentioned before, the different diameters of the filters 15 are due to manufacturing tolerances, wherein it is understood that the diameter of the filters 15 may neither be so small that the filter 15 slides downwards through the housing 2 and passes by the elevations 12 to slide out of the hollow space 4 of the housing 2, nor so large that no gap 28 can be formed between the outer circumference of the filter 15 and the inner circumference of the housing 2.

Clearance a is only present between the elevations 12, however not in the region of the elevations 12 as these serve as supporting location for the bottom side of the filter 15, and, in a spatial respect, may be referred to as flow-in cross section for the flow past the outer circumference of the filter 15, namely from the region causing the emissions, i.e. the tank not shown in the lower region of FIG. 9, towards the atmosphere (upper region of FIG. 9 or upper exit from the housing 2).

The constant clearance a thus enables an identical flow-in cross section even in the case of different diameters of the filters 15, namely irrespective of the manufacturing tolerances of differently sized filters 15.

FIG. 10 shows the housing 2 including the inserted filter 15 in a top view (view from the top onto the housing 2) according to FIG. 6. What is illustrated here is the three groups of snap-fit hooks 8, each of which includes four snap-fit hooks 8 for fixing and centering the filter 15 in the housing, as well as the honeycomb structure of the circularly cylindrically shaped filter 15. Gap 28 is illustrated to be present between the outer circumference of the filter 15 and the inner circumference of the housing 2.

Figure 11:
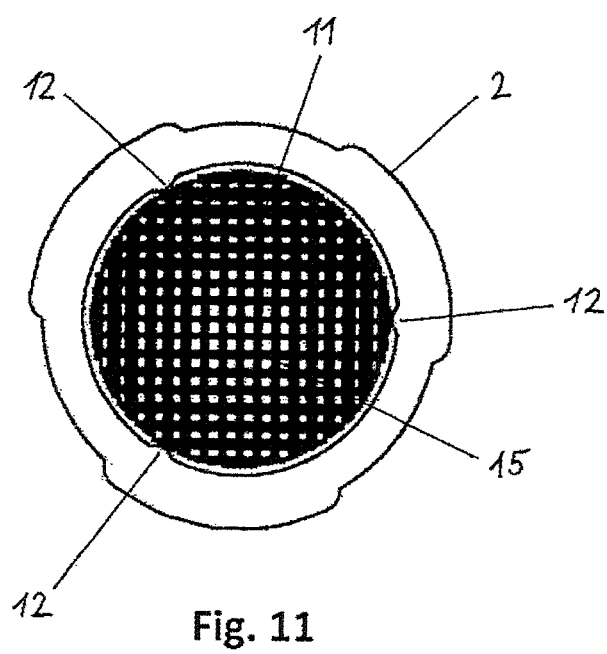
FIG. 11: A bottom view onto the housing according to FIG. 6

Further, FIG. 11 shows the bottom view (view from the bottom onto the housing 2) according to FIG. 6 including the filter 15 arranged in the housing 2. Here, the annular shoulder 10 is illustrated comprising a total of three elevations 12 on which the lower region of the filter 15 rests. Owing to the number of three elevations 12 as well as to their abutment surfaces that obliquely extend downwards, the filter 15 is centered also in the lower region of the housing 2, i.e. it is aligned to be central with respect to the longitudinal axis of the housing 2.

LIST OF REFERENCE SIGNS 1 longitudinal axis
2 housing
4 hollow space
6 wall
8 snap-fit hook
10 shoulder
11 bottom side of the filter
12 elevation
14 contact surface
15 filter
16 free end region of the snap-fit hook
17 upper termination of the filter
18 lower region of the snap-fit hook
20 wedge-shaped surface
22 surface of the shoulder
24 support surface
28 gap

What is claimed is:

1. Filter system as part of a fuel vapor buffer installation for reducing hydrocarbon emissions having at least one filter therein having channels and active carbon, the filter system comprising a housing for receiving the filter, wherein the housing has holding devices for fixing the filter and wherein at least one gap is provided between an inner wall of the housing and an outer circumference of the filter that has a fluid connection to a region causing the emissions and to the atmosphere;
    wherein said holding devices include a first holding device for fixing the filter in a lower region of the inner wall of the housing in the form of a circular, annular shoulder that tapers an open overall cross section in this region of the housing in which the annular shoulder has a support in the form of at least three elevations extending upwardly from the annular shoulder.

2. Filter system according to claim 1, in which a surface of the annular shoulder and support surfaces of the elevations are formed to extend obliquely downwards towards a center of the housing.

3. Filter system according to claim 2, in which the inclination of the surface of the annular shoulder and of the support surfaces of the elevations amounts to between 5° and 85°.

4. Filter system according to claim 1, in which a gap cross-sectional surface between the inner wall of the housing and the outer wall of the filter is defined with respect to a cross-sectional surface of the filter body such that a flow velocity through the gap is 0.1 to 2.0 times a flow velocity through the filter, as seen in a longitudinal flow-through direction of the body of the filter.

5. Filter system according to claim 1, in which the ratio of the gap cross-sectional surface between the inner wall of the housing and the outer wall of the filter with respect to the filter body cross-sectional surface is within a range of at least 50% to 75% but at least at one position as seen along a longitudinal extension of the housing and the filter, amounts to 1.0 to 0.001.

6. Filter system according to claim 1, further comprising at least three longitudinal ribs formed at the inner wall of the housing for fixing and centering the filter.

7. Filter system according to claim 1, in which the ratio of the gap cross-sectional surface between the inner wall of the housing and the outer wall of the filter with respect to the filter body cross-sectional surface is within a range of at least 50% to 75% but at least at one position as seen along a longitudinal extension of the housing and the filter, amounts to 0.5 to 0.003.

8. Filter system according to claim 3, in which the inclination amounts to one of:
    30°,
    45° and
    60°.

9. Filter system as part of a fuel vapor buffer installation for reducing hydrocarbon emissions having at least one filter therein having channels and active carbon, the filter system comprising a housing for receiving the filter, wherein the housing has holding devices for fixing the filter and wherein at least one gap is provided between an inner wall of the housing and an outer circumference of the filter that has a fluid connection to a region causing the emissions and to the atmosphere; and
    wherein said holding devices include a first holding device for fixing and centering the filter, the first holding device formed in an upper region of the housing in the form of at least three snap-fit hooks that are formed with the housing.

10. Filter system according to claim 9, in which the snap-fit hooks are arranged in a circular manner and on different levels at the inner wall of the housing, as seen with regard to a longitudinal axis of the housing.

11. Filter system according to claim 9, in which a gap cross-sectional surface between the inner wall of the housing and the outer wall of the filter is defined with respect to a cross-sectional surface of the filter body such that a flow velocity through the gap is 0.1 to 2.0 times a flow velocity through the filter, as seen in a longitudinal flow-through direction of the body of the filter.

12. Filter system according to claim 9, in which the ratio of the gap cross-sectional surface between the inner wall of the housing and the outer wall of the filter with respect to the filter body cross-sectional surface is within a range of at least 50% to 75% but at least at one position as seen along a longitudinal extension of the housing and the filter, amounts to 1.0 to 0.001.

13. Filter system according to claim 9, wherein said holding devices include a second holding device for fixing the filter in a lower region of the inner wall of the housing in the form of a circular, annular shoulder that tapers an open overall cross section in this region of the housing.

14. Filter system according to claim 9, further comprising at least three longitudinal ribs formed at the inner wall of the housing for fixing and centering the filter.

15. Filter system as part of a fuel vapor buffer installation for reducing hydrocarbon emissions having at least one filter therein having channels and active carbon, the filter system comprising:

a housing for receiving the filter, wherein the housing has holding devices for fixing the filter and wherein at least one gap is provided between an inner wall of the housing and an outer circumference of the filter that has a fluid connection to a region causing the emissions and to the atmosphere; and one of a fuel-vapor-permeable mesh and a fuel-vapor-permeable matted fiber structure made of a resilient material arranged in the gap between the housing and the filter for fixation of the filter in the housing.

16. Filter system according to claim 15, in which a gap cross-sectional surface between the inner wall of the housing and the outer wall of the filter is defined with respect to a cross-sectional surface of the filter body such that a flow velocity through the gap is 0.1 to 2.0 times a flow velocity through the filter, as seen in a longitudinal flow-through direction of the body of the filter.

17. Filter system according to claim 15, in which the ratio of the gap cross-sectional surface between the inner wall of the housing and the outer wall of the filter with respect to the filter body cross-sectional surface is within a range of at least 50% to 75% but at least at one position as seen along a longitudinal extension of the housing and the filter, amounts to 1.0 to 0.001.

18. Filter system according to claim 15, wherein said holding devices include a first holding device for fixing the filter in a lower region of the inner wall of the housing in the form of a circular, annular shoulder that tapers an open overall cross section in this region of the housing.

19. Filter system according to claim 15, further comprising at least three longitudinal ribs formed at the inner wall of the housing for fixing and centering the filter.

* * * * *